United States Patent
Kolesnik et al.

(10) Patent No.: US 11,275,659 B2
(45) Date of Patent: Mar. 15, 2022

(54) PROACTIVE CHERRY-PICKING TO BACK-PORT COMMITS

(71) Applicant: Red Hat Israel, Ltd., Ra'anana (IL)

(72) Inventors: Michael Kolesnik, Ra'anana (IL); Michel Peterson, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 291 days.

(21) Appl. No.: 16/273,889

(22) Filed: Feb. 12, 2019

(65) Prior Publication Data
US 2020/0257597 A1    Aug. 13, 2020

(51) Int. Cl.
*G06F 11/36* (2006.01)
*G06F 11/14* (2006.01)
*G06F 8/70* (2018.01)
*G06K 9/62* (2022.01)

(52) U.S. Cl.
CPC ............ *G06F 11/1474* (2013.01); *G06F 8/70* (2013.01); *G06F 11/1451* (2013.01); *G06F 11/3624* (2013.01); *G06K 9/6267* (2013.01)

(58) Field of Classification Search
CPC .... G06F 8/70; G06F 11/1451; G06F 11/1474; G06K 9/6267
See application file for complete search history.

(56) References Cited

U.S. PATENT DOCUMENTS

| | | | |
|---|---|---|---|
| 7,844,949 B2 | 11/2010 | Clemm et al. | |
| 9,354,867 B2 * | 5/2016 | Jain | G06F 8/70 |
| 2014/0136901 A1 * | 5/2014 | Butler | G06F 11/302 |
| | | | 714/38.1 |

OTHER PUBLICATIONS

Yi Li et al., Semantic Slicing of Software Version Histories, IEEE, 2017, retrieved online on Jan. 14, 2021, pp. 182-200. Retrieved from the Internet< URL: https://ieeexplore.ieee.org/stamp/stamp.jsp?tp=&arnumber=7843626>. (Year: 2017).*

Ralf Ramsauer et al., The List is the Process: Reliable Pre-Integration Tracking of Commits on Mailing Lists, Feb. 8, 2019, 41st ACM/IEEE International Conference on Software Engineering, retrieved online on Nov. 3, 2021, pp. 1-12. Retrieved from the Internet: <URL: https://arxiv.org/pdf/1902.03147.pdf>. (Year: 2019).*

(Continued)

*Primary Examiner* — Hanh Thi-Minh Bui
(74) *Attorney, Agent, or Firm* — K&L Gates LLP

(57) ABSTRACT

A system includes a memory and a processor in communication with the memory. The processor builds a preliminary history list of a plurality of commits including intermediary commits and a target commit, instantiates a target file list of files modified by the target commit, and instantiates an intermediary file list for each intermediary commit. Additionally, the processor classifies each intermediary commit as an intersecting commit or an empty commit. Responsive to classifying a respective intermediary commit as an empty commit, the processor removes the respective intermediary commit from the preliminary history list to create a candidate history list. Responsive to classifying a respective intermediary commit as an intersecting commit, the processor retains the respective intermediary commit in the candidate history list. Additionally, the processor joins the respective intermediary file list with the target file list and creates a finalized history list.

17 Claims, 9 Drawing Sheets

(56) References Cited

OTHER PUBLICATIONS

"Can you remove Git commits from a branch that exist in another branch like an "intersection" of commits?"; https://stackoverflow.com/questions/42877661/can-you-remove-git-commits-from-a-branch-that-exist-in-another-branch-like-an-i; (Stack Overflow); retrieved on Nov. 20, 2018; (23 Pages).
Nesha Zoric; "Cherry Picking with Git"; DEV Community; Jun. 25, 2018; (8 Pages).
Microsoft; Azure DevOps Services; "Resolve Git merge conflicts" Azure Repos | Microsoft Docs Hertz; Sep. 10, 2018; (6 Pages).
Atlassian Bitbucket; "Git merge conflicts"; https://www.atlassian.com/git/tutorials/using-branches/merge-conflicts; Publication Year: 2018; retrieved on Nov. 26, 2018; (9 Pages).
GitHub; "Backporting guidelines"; https://github.com/scalaz/scalaz/wiki/Backporting-guidelines; Publication Year: 2017; retrieved on Feb. 11, 2019; (6 Pages).

* cited by examiner

PROACTIVE CHERRY-PICKING TO BACK-PORT COMMITS

BACKGROUND

Developers may develop software through various development cycles resulting in different released versions of the software. Different versions of the software may include different features. In some instances, the features may be stand-alone features unique to a specific release and in other instances the features may be dependent on or related to features in different releases. In one example, software may include a master branch and a development cycle may involve a new development branch or stable branch. At different stages in the development, a commit may be saved to make a set of tentative changes permanent.

SUMMARY

The present disclosure provides new and innovative systems and methods for proactive cherry-picking to back-port commits in a source code management repository. In an example, a system includes a memory and a processor in communication with the memory. The processor is configured to build a preliminary history list of a plurality of commits including one or more intermediary commits and a target commit, instantiate a target file list of one or more files modified by the target commit, and instantiate an intermediary file list for each intermediary commit. Additionally, the processor is configured to classify each intermediary commit as one of an intersecting commit and an empty commit. Responsive to classifying a respective intermediary commit as an empty commit, the processor is configured to remove the respective intermediary commit from the preliminary history list to create a candidate history list. Responsive to classifying a respective intermediary commit as an intersecting commit, the processor is configured to retain the respective intermediary commit in the candidate history list. Additionally, the processor is configured to join the respective intermediary file list with the target file list and create a finalized history list.

In an example, a method includes building a preliminary history list of a plurality of commits including one or more intermediary commits and a target commit. The method also includes instantiating a target file list of one or more files modified by the target commit, instantiating an intermediary file list for each intermediary commit, and classifying each intermediary commit as one of an intersecting commit and an empty commit. Additionally, the method includes removing the respective intermediary commit from the preliminary history list to create a candidate history list responsive to classifying a respective intermediary commit as an empty commit. The method also includes retaining the respective intermediary commit in the candidate history list and joining the respective intermediary file list with the target file list responsive to classifying a respective intermediary commit as an intersecting commit. Additionally, the method includes creating a finalized history list.

In an example, a method includes building a preliminary history list of a plurality of commits including one or more intermediary commits and a target commit, creating a candidate history list with a first subset of intermediary commits from the preliminary history list, creating a finalized history list with a second subset of intermediary commits from the candidate history list, and executing an updated release branch with commits from the finalized history list. The finalized history list includes the target commit. Additionally, the finalized history list includes less commits than the preliminary history list.

Additional features and advantages of the disclosed methods, systems and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
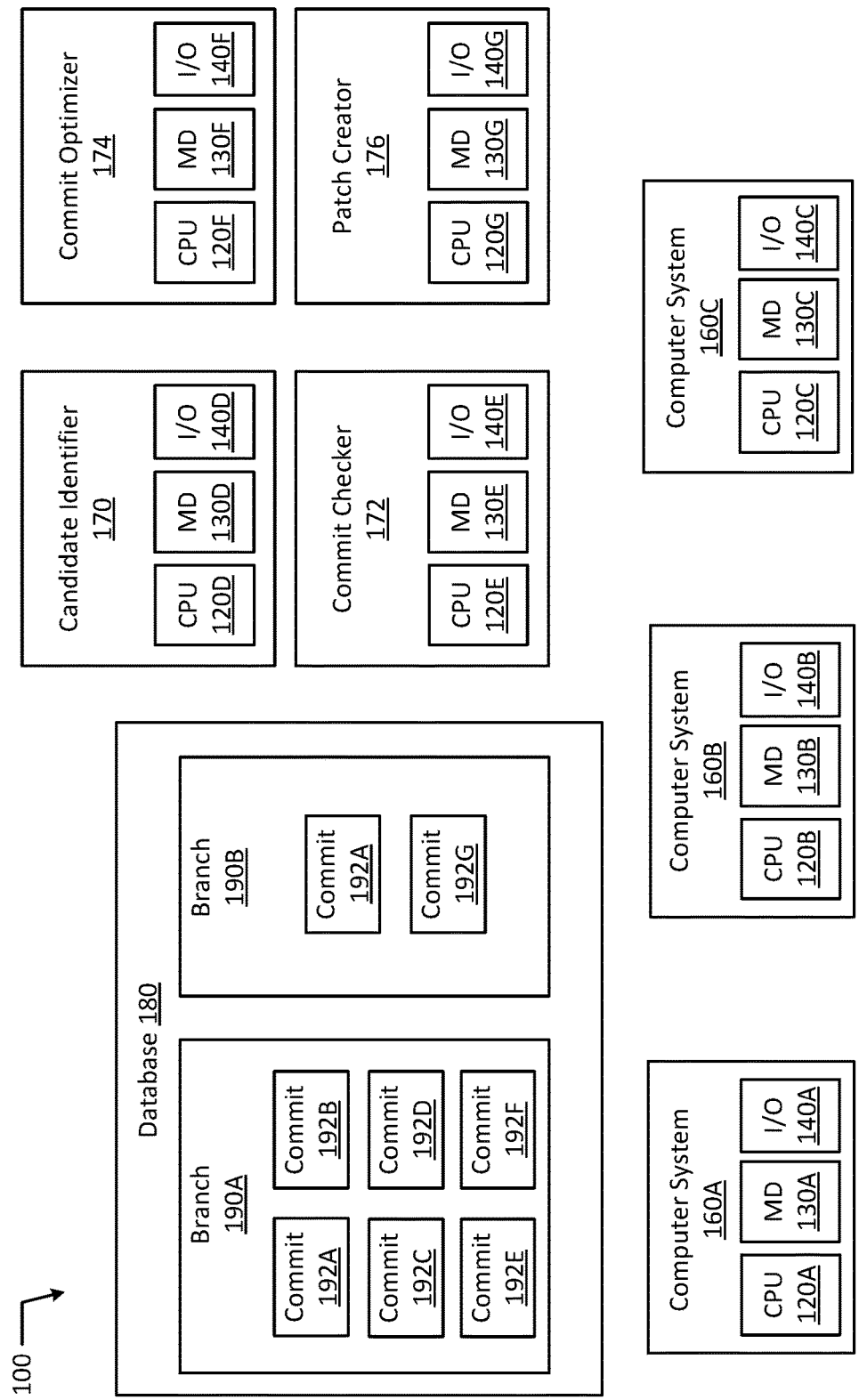
FIG. 1 illustrates a block diagram of an example computing system according to an example embodiment of the present disclosure.

Software revisions for applications may be tracked and implemented with commits or commit objects using a source code management tool such as Git. Git is a distributed version control system and it implements revisions as commit objects. When a developer commits changes into a repository a new commit object is created in the Git repository. Similarly, the developer may also copy an existing repository, which is typically called cloning and the resulting repository can be referred to as a clone.

A branch may be a named pointer to a commit. When working in a certain branch, the creation of a new commit may advance the pointer to the newly created commit. Additionally, each commit knows their parents (predecessors). Successors may be retrieved by traversing a commit graph starting from branches or other refs, symbolic reference (e.g. HEAD) or explicit commit objects. The commit graph is a graphical representation of the chain or timeline of commits in the Git repository. For example, a branch may define its own line of descendants in the overall version graph formed by all commits in a repository. New branches may be created from existing branches and the code may be changed independently from other branches. One of the branches is the default (typically named master or master branch). Local stable branches may be created off of the master branch when cloning the repository.

When a developer commits their changes into a repository, a new commit object is created in the repository (e.g., Git repository). The new commit object uniquely identifies a new revision of the content (e.g., source code) of the repository. The revision may be retrieved later, for example, if the developer wants to access the source code of an older version. HEAD is a symbolic reference most often pointing to the currently checked out branch. Sometimes the HEAD points directly to a commit object. Additionally, the first predecessor of HEAD may be addressed via HEAD-1, HEAD-2 and so on. Typically, if a developer switches to a different branch, the HEAD pointer moves to the last commit in the different branch.

When releasing a version of a product, which uses a source code management tool (e.g., Git), typically a "stable branch" is created that stems off the main chain (also known as a master branch) of commits to represent the version (e.g., version X.1) that is being released. In such a scenario, work may continue on the main chain or master branch while the stable branch retains the commits that were present at the time of release X.1.

Commits may be continuously introduced to the master branch and may be back-ported to the stable branch X using a process known as "cherry-picking". For example, a developer may issue a "git cherry-pick" command, which attempts to apply the delta introduced by the commit (e.g., commit with hash_A) to the stable branch.

However, if the code on the source branch (e.g., master branch) diverges too much from the destination branch (e.g., stable branch), then the "cherry-pick" may not be applied cleanly. For example, a cleanly applied "cherry-pick" could be ported to the destination branch without back-porting other intermediary commits or modifying the source code to accommodate the "cherry-pick" commit. When the "cherry-pick" is not cleanly applied, the source code management tool may attempt to resolve a conflict between the source code of the "cherry-pick" and the source code of previous commits in the stable branch. The source code management tool may attempt to resolve the conflict automatically or may request manual conflict resolution by the developer. The situation requiring code conflict resolution is typically known as "merge conflict."

In the case of manual conflict resolution, the developer performing the cherry-pick manually analyzes the problem and applies a solution to resolve the conflict. For example, the developer may re-write portions of the source code or attempt to "cherry-pick" an earlier commit (e.g., an older commit) closer to where the stable branch started. Generally, the developer manually guesses which earlier commit to include. One possible solution is to abort the cherry-pick, which cannot be cleanly applied due to errors, and return to the last known error-free state or reference point where the commit graph is error free, and then the developer may track down older commits present in the source branch, but not in the destination branch, and cherry-pick the older commits before attempting to cherry-pick the specific code feature the developer needs. For example, some of the older commits may include portions of source code that the specific code feature depends on. However, when cherry-picking older commits, the developer again may encounter a "merge conflict" and may again have to manually resolve the conflict, which can be time consuming and burdensome. In addition, the developer might inadvertently cherry-pick an intermediary commit, which the developer believes is needed to resolve the conflict in the target commit, but the intermediary commit is actually not related and has no additional value when cherry-picked to the stable branch.

Another solution to resolve the merge conflict is that the developer may modify the source code being cherry-picked and resolve the conflict manually. However, by modifying the code being cherry-picked, the developer is likely to cause merge conflicts with other later cherry-picks to the same branch. Additionally, manual modification of the source code may be error prone and may introduce other problems in the source code that would not exist if instead the resolution was completed by the source code management tool.

The proposed solutions above are time consuming and may require additional manual conflict resolution using both human and computer resources and delaying the development cycle. Additionally, the proposed solutions above may create additional problems with the source code requiring additional time and resources to resolve.

As described in the various example embodiments herein, to reduce downtime and improve the speed, efficiency and reliability of back-porting commits to a stable branch for a new release, techniques are disclosed for proactive cherry-picking to back-port commits. For example, the systems and methods disclosed herein build a history list of all commits from the moment of branching in the master list until the target commit, which is the commit to be cherry-picked and back-ported for the new version release. Then, file lists are instantiated for the target commit and each intermediary commit from the moment of branching. If an intermediary commit touches or intersects (e.g., read, write, access) any of the same files as the file list for the target commit, the respective intermediary commit is retained in the history list. Conversely, if an intermediary commit does not touch or intersect any of the same files as the file list for the target commit, the respective intermediary commit is removed from the history list. For example, without an intersection, back-porting the intermediary commit is unnecessary as it is unrelated to the file changes implemented by the target commit. After determining which intermediary commits are relevant as potential additional back-porting candidates, the systems and methods disclosed herein further optimizes the candidates by removing each candidate one at a time from the history list and attempting to cherry-pick each remaining commit in the list. If cherry-picking each the remaining commits in the history list is successful, then the candidate commit may be removed from the history list. For example, if cherry-picking each commit in the list is successful even after removing a candidate commit, then the candidate commit is unnecessary for the back-port as the remaining commits cover each of the touched filed (e.g., have the required dependencies in their own source code). However, if cherry-picking is unsuccessful after removing a candidate commit, then the commit is retained in the finalized history list. After determining the finalized history list, the remaining intermediary commits along with the target commit are back-ported to the stable branch for the new release.

Unlike manually guessing what intermediary commits to include or manually rewriting the source code to resolve conflicts when cherry-picking the target commit, the systems and methods of the present disclosure automatically determine which intermediary commits to back-port along with the target commit. The previously proposed solutions of manual back-porting often resulted in additional merge conflicts, which delayed the release of the new update which was time consuming and computationally expensive. Additionally, manually modifying the code being cherry-picked is an error prone process and may often cause merge conflicts with other later cherry-picks to the same branch, which may create additional problems with the source code resulting in additional delays and requiring additional resources to resolve.

By automatically and proactively cherry-picking and back-porting the target commit and related intermediary commits, the system and methods disclosed herein may reduce downtime and improve the speed, efficiency and reliability of back-porting commits to a stable branch for a new release.

The present disclosure is especially advantageous to software developers and cloud providers that implement software updates over the cloud. For example, cloud providers may want to improve the efficiency and speed up software update deliveries to customers. Additionally, software developers may want to efficiently and quickly finalize new software releases by eliminating manual cherry-picking and back-porting. For example, cloud providers like Red Hat® Cloud Suite may utilize an automated proactive cherry-picking and back-porting system to allow developers to quickly and efficiently release new software versions to their customers.

FIG. 1 depicts a high-level component diagram of an example computing system 100 in accordance with one or more aspects of the present disclosure. The computing system 100 may include a database 180, a candidate identifier 170, a commit checker 172, a commit optimizer 174, a patch creator 176 and nodes or computer systems 160A-C. The candidate identifier 170, commit checker 172, commit optimizer 174, and patch creator 176 may include respective processors (e.g., central processing units 120D-G), memory devices 130D-G and input/output devices 140D-G. In another example, the candidate identifier 170, commit checker 172 and commit optimizer 174 may be part of one or more of the computer systems 160A-C or the corresponding processors of those systems (e.g., CPU 120A-C).

The database 180 may include source code with branches 190A-B (e.g., master branches or stable branches). Each branch 190A-B, hereinafter referred to generally as branch 190, may include one or more commits 192A-G. As illustrated in FIG. 1, commits (e.g., commit 192A) may be present on several different branches 190. For example, a commit (e.g., commit 192A) may be on a master branch and may also be back-ported to several other stable branches for different versions or product releases.

The computer system 100 may include one or more nodes or computer systems 160A-C. Each node or computer system 160A-C may in turn include one or more physical processors (e.g., CPU 120A-C) communicatively coupled to memory devices (e.g., MD 130A-C) and input/output devices (e.g., I/O 140A-C). Each node or computer system 160A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor 120A-G refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-G refers to a volatile or non-volatile memory device, such as RAM, ROM, EEPROM, or any other device capable of storing data. As discussed herein, I/O device 140A-G refers to a device capable of providing an interface between one or more processor pins and an external device capable of inputting and/or outputting binary data.

Processors (e.g., CPUs 120A-G) may be interconnected using a variety of techniques, ranging from a point-to-point processor interconnect, to a system area network, such as an Ethernet-based network. Local connections within each node, including the connections between a processor 120A-G and a memory device 130A-G may be provided by one or more local buses of suitable architecture, for example, peripheral component interconnect (PCI).

Figure 2A:
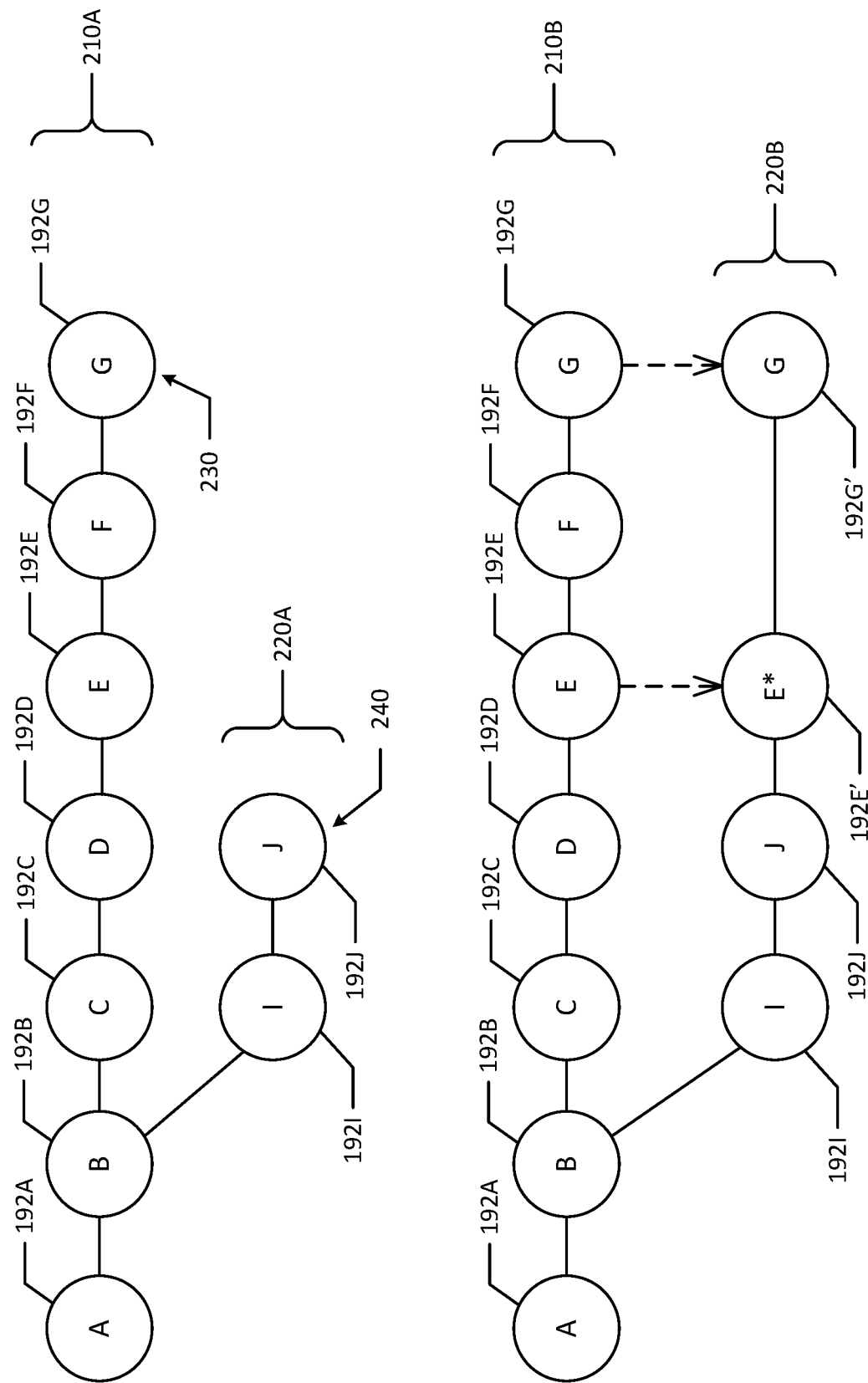
FIGS. 2A and 2B illustrate high-level component diagrams of commits back-ported from a master branch to a stable branch according to example embodiments of the present disclosure.
Figure 2B:
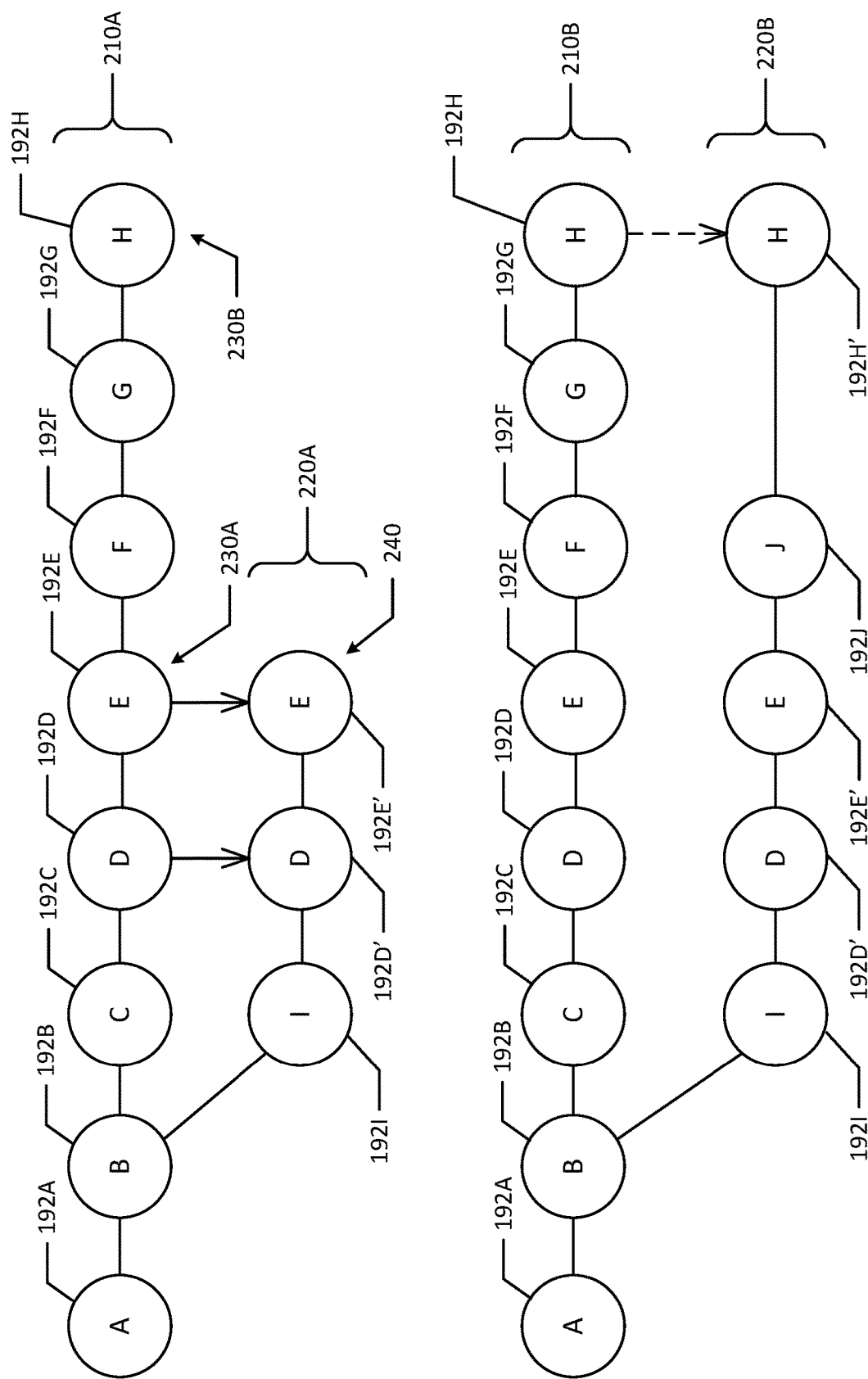

FIGS. 2A-2B depict examples of back-porting from a master branch to a stable branch. As illustrated in FIG. 2A, the master branch 210A includes commits 192A-G (e.g., commits "A", "B", "C", "D", "E", "F" and "G"). The stable branch or release branch 220A, which is illustrated below the master branch 210A, includes commits 192A-B and 192I-J (e.g., "I" and "J"). The stable branch or release branch stems or branches off of commit 192B (e.g., commit "B"). In an example, there may be a period where the focus is on fixing release-critical bugs and applying patches to commits in the master branch 210A. In another example, a new commit may have been created in the master branch 210A manually, and a patch may be used to bridge the stable branch 220A. After the bugs are fixed, a release branch 220A may be started. Even after the release branch 220A is started, the master branch 210A may continue to develop (e.g., develop with commits 192C-G). Additionally, a developer may decide to implement a portion of source code or a commit (e.g., target commit 230) from the master branch 210A in the release branch 220A.

As described in further detail below, the systems and methods described herein may automatically cherry-pick a target commit 230 from the master branch 210A and port the target commit 230 to the release branch 220A along with any other intermediate commits. For example, as illustrated in master branch 210B and release branch 220B, the target commit 230 and intermediate commit 192E*(e.g., commit "E" with patch "*" that fixes release-critical bug) are ported to the release branch 220B. In an example, when further release-critical bugs are found in the release branch 220B, the bugs are fixed in the master branch 210B.

When attempting to cherry-pick and back-port commits, a developer may create a hash to a save point 240, which may indicate the last error-free reference point on a branch. In an example, the save point 240 may be previously cherry-picked commit.

Another example is illustrated in FIG. 2B where the master branch 210A includes commits 192A-H (e.g., commits "A", "B", "C", "D", "E", "F", "G" and "H"). The stable branch or release branch 220A includes commit 192I (e.g., commit "I") and branches off of commit 192B (e.g., commit "B"). The developer may initially cherry-pick target commit 230A and port both the target commit 230A (e.g., commit "E") and intermediate commit 192D (e.g., commit "D") to the release branch 220A. In the illustrated example, "cherry-picking" commit "E" may require back-porting the intermediate commit "D", but intermediate commit "C" may be unnecessary. For example, commit "C" may not touch any of the same files as commit "E".

After some time, both the master branch 210A and the release branch 220B may continue to develop. For example, the master branch 220A may continue to develop with commits 192F-H. Additionally, the release branch may continue to develop with commit 192J (e.g., commit "J"). Then, a developer may decide to implement another portion of source code or commit (e.g., target commit 230B) from the master branch 210A in the release branch 220A. For example, the developer may create a hash save point 240 on commit 192E and may cherry-pick another target commit 230B (e.g., commit "H") from the master branch 210A. Then, the systems and methods described herein may automatically cherry-pick the target commit 230B and port the target commit 230B to the release branch 220B. In the example illustrated in FIG. 2B, the target commit 230B may be ported without any other intermediate commits.

Figure 3:
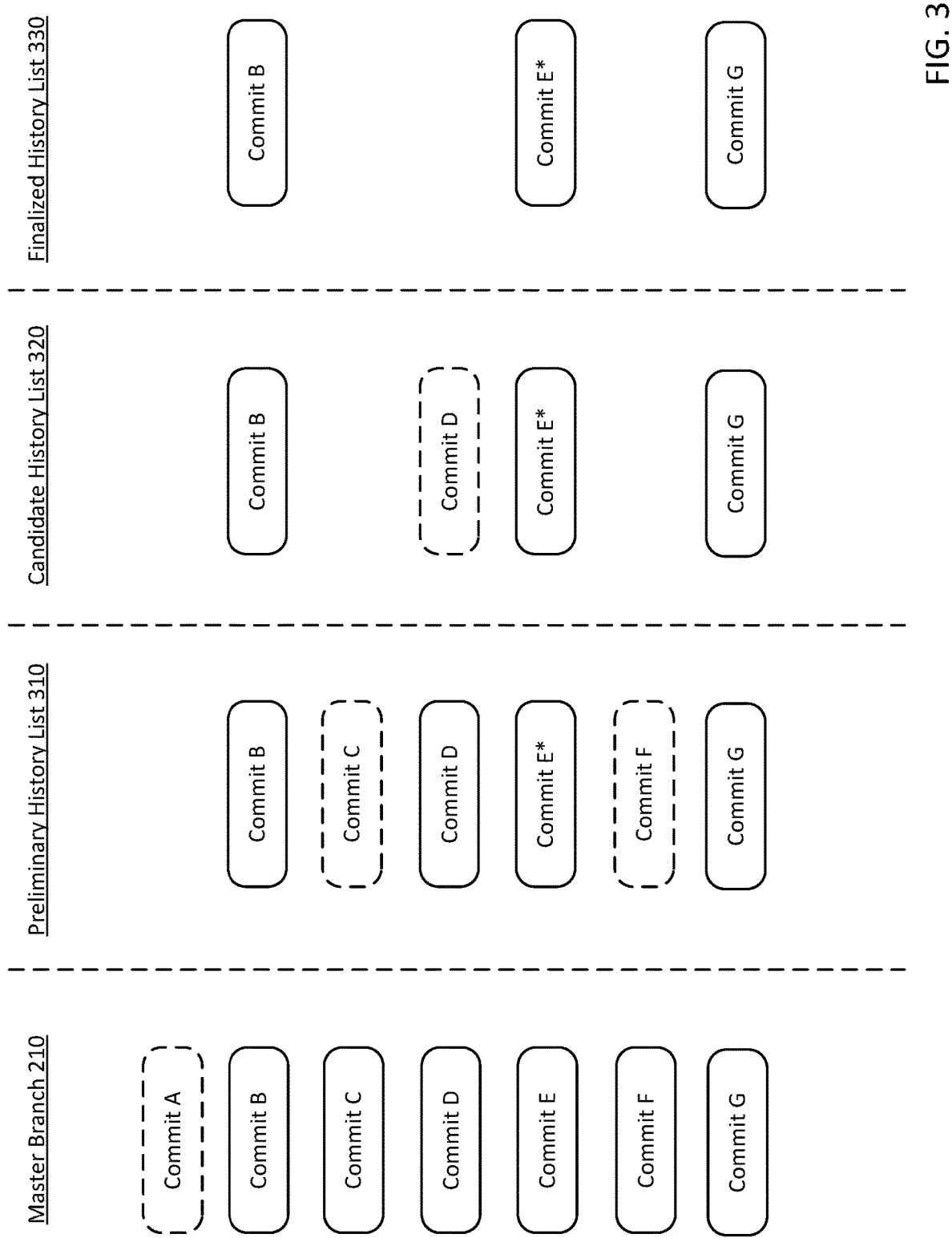
FIG. 3 illustrates a high-level component diagram of an example proactive cherry-picking and back-porting process according to an example embodiment of the present disclosure.

FIG. 3 depicts a high-level component diagram of an example proactive cherry-picking and back-porting process. FIG. 3 provides an example illustration for the method 400 illustrated in FIG. 4. Additionally, FIG. 3 provides another illustration of the cherry-picking process and corresponds to FIGS. 2A-B. Master branch 210 includes commits "A", "B", "C", "D", "E", "F" and "G". The preliminary history list 310 includes commits "B", "C", "D", "E", "F" and "G". Commit "A" is not included in the preliminary history list 310 because it occurs before the moment of branching. In another example, commit "B" may be removed from the preliminary history list 310, candidate history list 320 and finalized history list 330 because commit "B" is already part of the stable branch from the master branch (e.g., commit "B" is the moment of branching). The candidate history list 320 includes commits "B", "D", "E" and "G". Additionally, the finalized history list 330 includes commits "B", "E" and "G". The master branch 210, preliminary history list 310, candidate history list 320 and finalized history list 330 will be discussed in further detail below.

Figure 4:
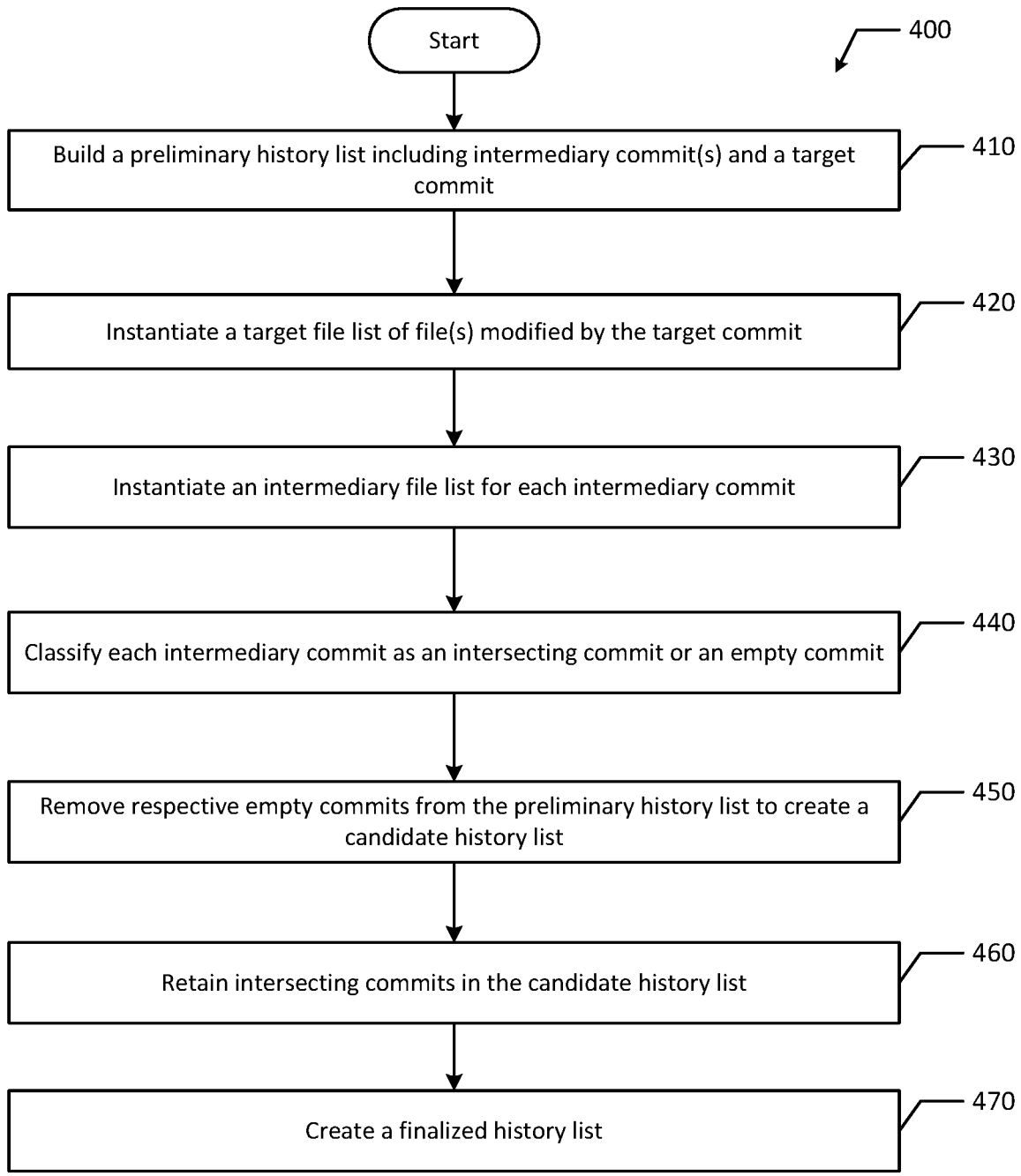
FIG. 4 illustrates a flowchart of an example process for proactive cherry-picking and back-porting commits according to an example embodiment of the present disclosure.

In an example, an exemplary cherry-picking and back-porting algorithm may include:
1. Build a history of all commits from the moment of branching until the target commit (e.g., the commit wanted for cherry-picking, also referred to as the "original cherry-pick")
2. Instantiate a target file list with all of the files modified by the target commit
3. Traverse the history from newest to oldest, for each commit:
   3.1. Instantiate an intermediary file list of all the files modified by the commit being analyzed
   3.2. Intersect the intermediary file list with the target file list
      3.2.1. If the intersection is empty, remove the commit from the history
      3.2.2. Otherwise, join the lists and store the result in the file list (remove any duplicates)
4. Save the hash of the commit in the target branch (also referred to as the "stable head")
5. Traverse the history from the oldest to the newest, for each commit:
   5.1. Try to cherry-pick the commit
      5.1.1. If the commit is in merge conflict, automatically resolve the conflict or ask the user to resolve the conflict
      5.1.2. After the conflict is resolved, save the difference in a difference patch and save a reference to the cherry-picked commit hash
6. Reset the branch to stable head (this drops all applied commits)
7. Traverse the history from the oldest to the newest, for each commit (from now on "candidate commit"):
   7.1. Remove the candidate commit from the history
   7.2. Copy the history to a copy (from now on "history copy")
   7.3. Traverse the history copy from the oldest to the newest, for each commit:
      7.3.1. If there is a patch from step 5.1.2, apply the patch
      7.3.2. Otherwise, cherry-pick the original commit
      7.3.3. If either of the previous operations goes into merge conflict, then:
         7.3.3.1. Reset to the stable head
         7.3.3.2. Cherry pick the candidate commit or apply the patch from step 5.1.2
         7.3.3.3. Update the stable head to the working copy commit hash
         7.3.3.4. Continue to the next commit from step 7
   7.4. Reset to the stable head
8. Cherry-pick the original cherry-pick commit FIG. 4 illustrates a flowchart of an example method 400 for proactive cherry-picking and back-porting commits. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

Method 400 includes building a preliminary history list including intermediary commit(s) and a target commit (block 410). For example, a processor 120 may build a preliminary history list 310 of a plurality of commits 192 (e.g., commits 192B-G) including one or more intermediary commits 192 (e.g., commits 192B-F) and a target commit 230. In the example illustrated in FIG. 3, the master branch includes commits 192A-G (e.g., commits "A", "B", "C", "D", "E", "F" and "G"). To automatically port the target commit 230 and any other required intermediary commits, the processor 120 may build a preliminary history list 310 of each of the commits from the moment of branching (e.g., at commit "B") up to and including the target commit 230 (e.g., commit "G"). In the illustrated example, the preliminary history list 310 includes commits "B", "C", "D", "E", "F" and "G". As discussed above, the preliminary history list 310 does not include commit "A" because commit "A" occurs before the moment of branching. Additionally, commit "B" may be removed from the preliminary history list 310, candidate history list 320 and finalized history list 330 because commit "B" is already part of the stable branch from the master branch (e.g., commit "B" is the moment of branching). For example, the preliminary history list 310 may start with commit "C".

Then, the method 400 includes instantiating a target file list of file(s) modified by the target commit (block 420). For example, the processor 120 may instantiate the target file list with all of the files modified by the target commit 230 (e.g., the original cherry-picked commit or commit "G"). Then, method 400 includes instantiating an intermediary file list for each of the intermediary commits (block 430). For example, the processor 120 may instantiate the intermediary file lists for each of the intermediary commits (e.g., commits "B", "C", "D", "E" and "F"). In an example, instantiating the intermediary file lists may include traversing the preliminary history list 310 from the newest commit (e.g., commit "F") to the oldest commit (e.g., commit "B") and instantiating a respective intermediary file list for each intermediary commit (e.g., commit "B", "C", "D", "E" and "F"). Each intermediary file list includes a list of files modified by the respective intermediary commit. For example, while traversing the preliminary history list 310, the processor 120 may instantiate an intermediary file list for each commit analyzed during the traversal.

Additionally, method 400 includes classifying each intermediary commit as an intersecting commit or an empty commit (block 440). For example, the processor 120 may classify each intermediary commit as an intersecting commit (e.g., commit "B", commit "D" and commit "E") or an empty commit (e.g., commit "C" and commit "F"). As each intermediary commit is traversed and a respective intermediary file list is instantiated, the processor 120 may intersect the respective intermediary file list with the target file list. Then, the processor may classify each intermediary commit as either an intersecting commit (e.g., commit "B", commit "D" and commit "E") or an empty commit (e.g., commit "C" and commit "F") based on the results from intersecting the respective intermediary file list with the target file list. Specifically, the processor 120 may intersect the intermediary file list for commit "B" with the target file list for commit "G" and may use that result to classify commit "B". Then, the processor 120 may intersect intermediary file list for commit "C" with the target file list for commit "G" and classify commit "C" based on the intersection. The processor may similarly intersect the intermediary file lists for commits "D", "E" and "F" with the target file list "G" to classify the remaining intermediary commits. In an example, as each intersecting commit is identified, its respective intermediary file list may be joined with the target file list before the next classification. For example, commit "B" may be classified as an intersecting commit and its intermediary file list may be joined with the target file list to create an updated target file list. In an example, duplicate files may be removed from the updated target file list. Then, the target file list for commit "C" may be compared with the updated target file list to determine if commit "C" is an intersecting commit or an empty commit.

Method 400 also includes removing respective empty commits from the preliminary history list to create a candidate history list (block 450). For example, responsive to classifying a respective intermediary commit as an empty commit, the processor 120 may remove the respective intermediary commit from the preliminary history list 310 to create a candidate history list 320. Specifically, if the intersection results in an empty comparison (e.g., the intermediary file list and the target file list do not have any files in common), then the commit may be classified as an empty commit and may be removed from the candidate history list 320. In the example illustrated in FIG. 3, commit "C" and commit "F" are classified as empty commits and are removed from the preliminary history list 310 when creating the candidate history list 320.

Additionally, method 400 includes retaining intersecting commits in the candidate history list (block 460). For example, responsive to classifying a respective intermediary commit as an intersecting commit, the processor 120 may retain the respective intermediary commit in the candidate history list 320. Specifically, if the intermediary file list and the target file list have files in common (e.g., the lists at least partially intersect), then the intermediary commit may be classified as an intersecting commit and may be retained in the candidate history list 320. In the example illustrated in FIG. 3, commits "B", "D" and "E" are classified as intersecting commits and are retained in the candidate history list 320.

Then, method 400 includes creating a finalized history list (block 470). For example, the processor 120 may create the finalized history list 330. To optimize the candidate history list 320 and create the finalized history list 330, each remaining intermediary commit (e.g., commit "B", "D" and "E") in the candidate history list 320 may be analyzed to determine whether the commit can be eliminated instead of back-ported. For example, the candidate history list 320 may be traversed from the oldest commit to the newest commit and each remaining intermediary commit (e.g., candidate commit, such as commit "B") may be removed from the candidate history list 320. Then, the processor 120 may copy the candidate history list 320 to create a copy history list to perform several iterations before creating the finalized history list 330. The processor 120 may also traverse the copy history list from oldest to newest and try to cherry-pick each commit in the list. If any of the cherry-pick attempts fail, then the candidate commit is retained in the finalized history list 330 and is eventually back-ported to the sable branch for the new release. However, if each of the cherry-pick attempts are successful, then the candidate commit does not affect the remaining commits (e.g., the other commits have the required dependencies in their own source code), then the candidate commit may be removed instead of back-ported.

For example, commit "B" may be removed from the history copy and the system may attempt to cherry-pick each remaining commit (e.g., commit "D", commit "E", commit "F" and commit "G") from the history copy. If at least one of the cherry-pick attempts fail, then the processor 120 may retain the candidate commit (e.g., commit "B") in the finalized history list 330. Similarly, commit "D", commit "E" and commit "F" are also chosen as candidate commits and are analyzed with cherry-pick attempts in their respective history copies. As illustrated in FIG. 3, when candidate commit "D" is removed from the conditional history list 320, each of the cherry-pick attempts for commits "B", "E" and "G" are successful and the candidate commit "D" may be removed from the finalized history list 330.

In another example, the copy history lists may be used create history lists that are analyzed and run in parallel (see steps 7 to 8 in sample algorithm above). For example, the processor may create a save point 240 and then may attempt to remove a commit (e.g., commit "B") from one history copy and then may proceed with attempting to cherry-pick each remaining intermediary commit and back-port the commits to the stable branch. When an error is encountered, the processor may reset to a stable head or the save point 240 and may attempt cherry-picking and back-porting commits after removing a different intermediary commit. This process may be conducted on several copy history lists until a stable branch is created with the proper commits back-ported along with the target commit. The list of commits that are back-ported along with the target commit 230 may be used to create the finalized history list 330.

Figure 5:
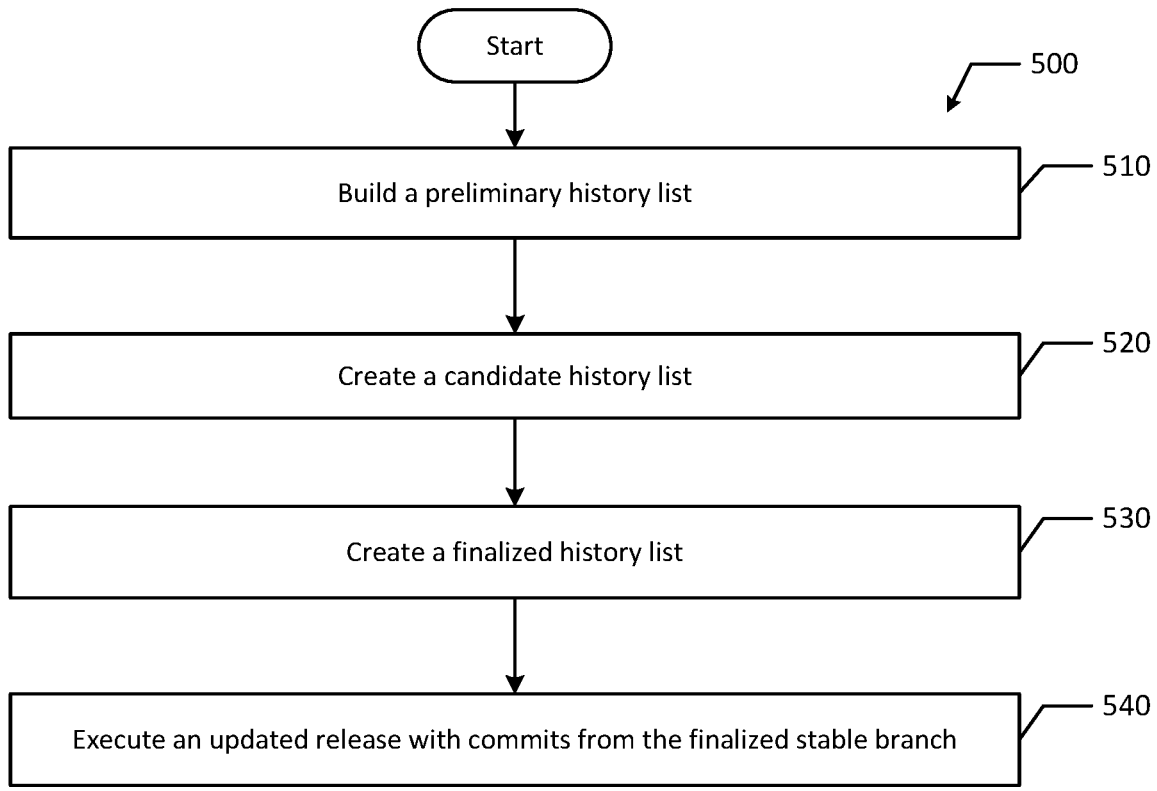
FIG. 5 illustrates a flowchart of an example process for completing a cherry-pick and back-port procedure to execute an update release according to an example embodiment of the present disclosure.

FIG. 5 illustrates a flowchart of an example method 500 for completing a cherry-pick and back-port procedure to execute an update release. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, blocks may be repeated, and some of the blocks described are optional. The method 500 may be performed by processing logic that may comprise hardware (circuitry, dedicated logic, etc.), software, or a combination of both.

The example method 500 includes building a preliminary history list (block 510). For example, a processor 120 may build a preliminary history list 310 of a plurality of commits 192 including intermediary commit(s) and a target commit 230. For example, as illustrated in FIG. 2B, the preliminary history list 310 may include commits "C", "D", "E", "F", "G" and "H", where commit "H" is the target commit 230. The method also includes creating a candidate history list (block 520). For example, the processor 120 may create a candidate history list 320 with a first subset of the intermediary commits from the preliminary history list 310. As illustrated in FIG. 2B, the candidate history list 320 may include commits "D", "E", "F" and "H". For example, commits "C" and "G" may be empty commits and removed from the preliminary history list 310 when creating the candidate history list 320. Additionally, method 500 includes creating a finalized history list (block 530). For example, the processor 120 may create a finalized history list 330 with a second subset of the intermediary commits from the candidate history list 320. As illustrated in FIG. 2B, the finalized history list 320 may include commits "D", "E" and "H". For example, commit "F" may be eliminated from the candidate history list 320 because cherry-picking and back-porting was successful after the removal of commit "F". The first subset and the second subset may be the same. For example, the candidate history list 320 and the finalized history list 330 may include the same intermediary commits. Alternatively, the second subset may include less intermediary commits than the first subset.

The above identified steps of method 500 (e.g., blocks 510, 520 and 530) may be performed in the same or a similar fashion to those of method 400 (e.g., blocks 410 to 470) as illustrated in FIG. 4.

Then, method 500 includes executing an updated release branch with commits from the finalized stable branch (block 540). For example, the processor 120 may execute an updated release branch with commits 192 from the finalized history list 330. The finalized history list includes the target commit 230. The finalized history list 330 may also include one or more of the intermediary commits. Additionally, the finalized history list 330 may include less commits 192 than the preliminary history list 310 and/or the candidate history list 320. By proactively cherry-picking and back-porting commits 192 for the updated release branch, the updated release branch may be finalized with less down time compared to the manual cherry-picking methods. By reducing down time, the systems and methods disclosed herein efficiently optimize source code for updated software releases, which enables developers to quickly deliver software updates to customers.

Figure 6A:
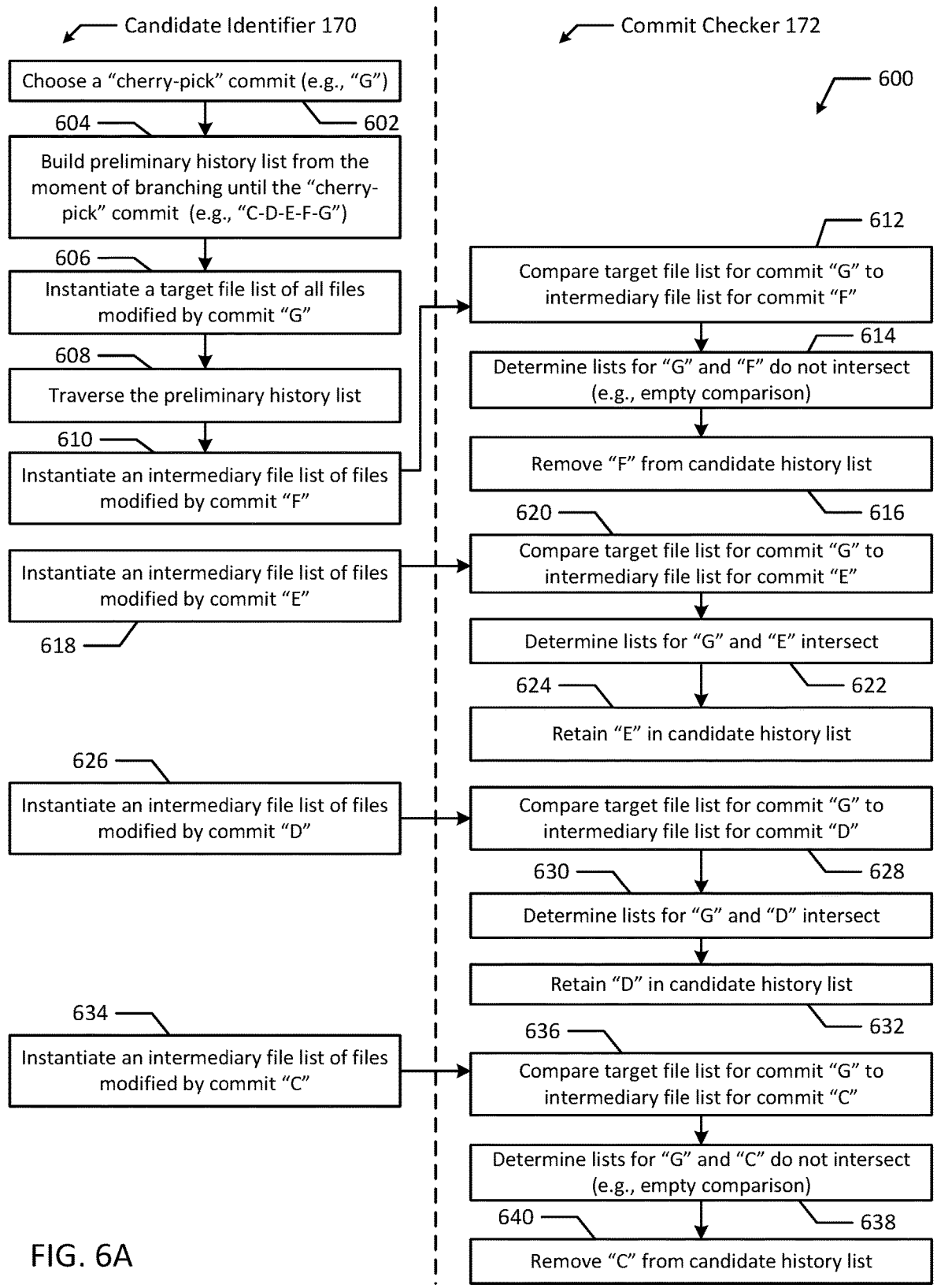
FIGS. 6A and 6B illustrate a flow diagram of an example process for creating a finalized history list of cherry-picked and back-ported commits according to an example embodiment of the present disclosure.
Figure 6B:
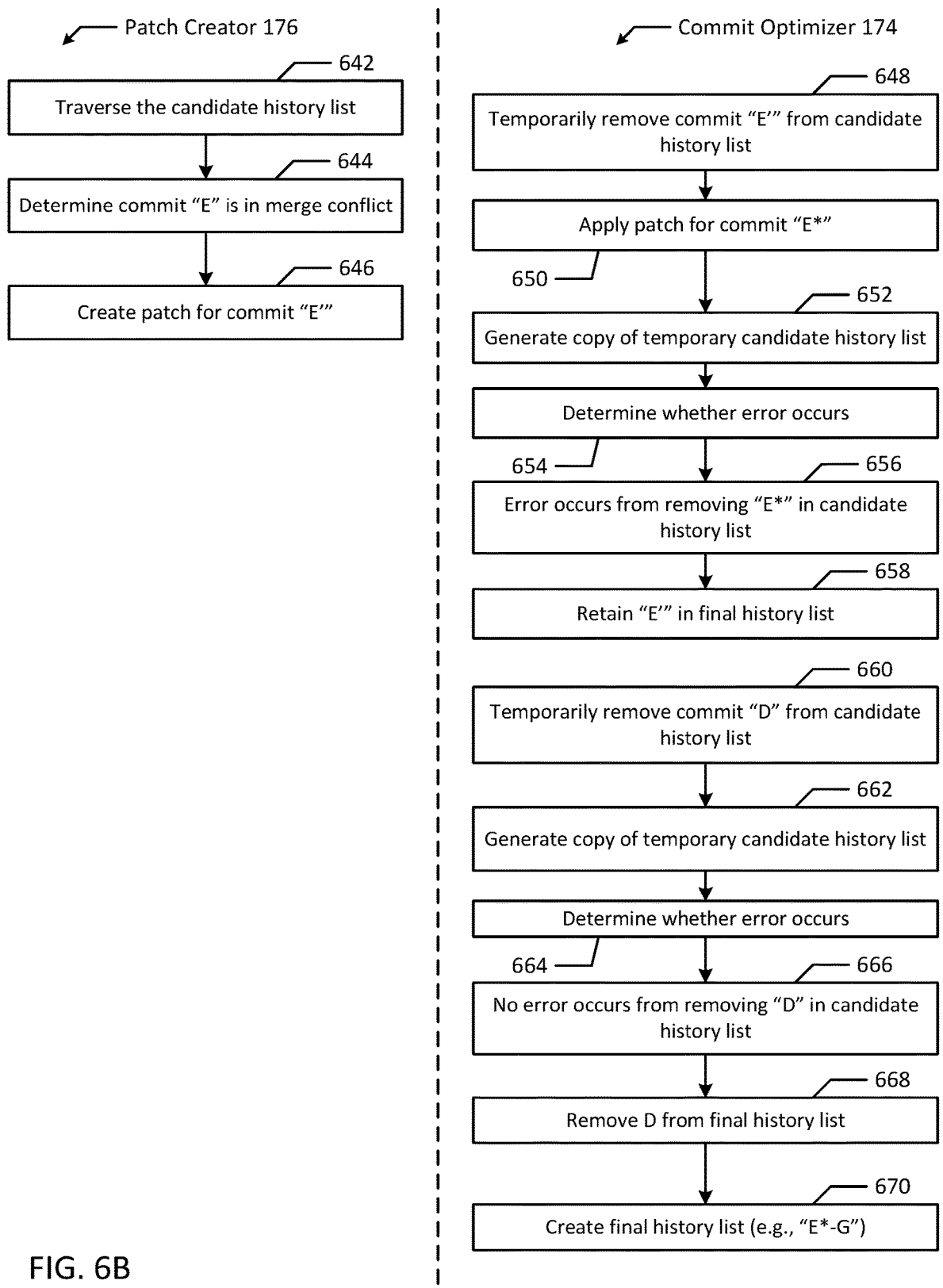

FIGS. 6A and 6B illustrates a flowchart of an example method 600 for creating a finalized history list of cherry-picked and back-ported commits. Although the example method 600 is described with reference to the flowchart illustrated in FIGS. 6A and 6B, it will be appreciated that many other methods of performing the acts associated with the method 600 may be used. For example, the order of some of the blocks may be changed, certain blocks may be combined with other blocks, blocks may be repeated, and some of the blocks described are optional. For example, a candidate identifier 170, a commit checker 172, a commit optimizer 174 and a patch creator 176 may communicate to perform example method 600.

In the illustrated example, a candidate identifier 170 choses a "cherry-pick" commit or a target commit 230 (e.g., commit "G") (block 602). For example, the target commit 230 or the "cherry-pick" commit may be commit "G" from FIG. 2A. Then, the candidate identifier 170 builds a preliminary history list 310 from the moment of branching until the cherry-pick" commit (block 604). For example, as illustrated in FIG. 2A, the candidate identifier 170 may build a preliminary history list of commits "C", "D", "E", "F" and "G" from the master branch 210, which includes the target commit 230 (e.g., commit "G") and each intermediate commit (e.g., commits "C", "D", "E" and "F") from the moment of branching (e.g., commit "B). Then, the candidate identifier may instantiate a target file list of all the files modified by commit "G" (block 606). The file list may include files modified through the source code of commit "G". In an example, the target file list may include a list of each file accessed, read, written to, executed, etc. by the source code of commit "G".

The candidate identifier 170 may also traverse the preliminary history list 310 (block 608). For example, the candidate identifier 170 may traverse the preliminary history list 310 from the newest intermediary commit (e.g., commit "F") to the oldest intermediary commit (e.g., commit "C"). Alternatively, the candidate identifier 170 may traverse the preliminary history list 310 from the oldest intermediary commit (e.g., commit "C" to the newest intermediary commit (e.g., commit "F"). Then, the candidate identifier 170 may instantiate and intermediary file list of files modified by commit "F" (block 610). In an example, the target file list may include a list of each file accessed, read, written to, executed, etc. by the source code of commit "F".

Then, the commit checker 172 may compare the target file list for commit "G" to the intermediary file list for commit "F" (block 612). In the illustrated example, the commit checker 172 may determine that the target file list for commit "G" and the intermediary file list for commit "F" do not intersect (block 614). For example, the intersection of the lists may be empty meaning that the source code for commit "G" and the source code for commit "F" do not touch or intersect any of the same files. Then, commit checker 172 removes commit "F" from the candidate history list 320 (block 616).

Next, the commit checker instantiates an intermediary file list of files modified by commit "E" (block 618). Similar to the process for commit "F", the commit checker 172 compares the target file list for commit "G" to the intermediary file list for commit "E" (block 620). In the illustrated example, the commit checker 172 may determine that the target file list for commit "G" and the intermediary file list for commit "E" intersect (block 622). For example, the intersection of the lists may have overlapping files meaning that the source code for commit "G" and the source code for commit "E" touch or intersect at least some of the same files. Then, commit checker 172 retains commit "E" in the candidate history list 320 (block 624).

Next, the commit checker instantiates an intermediary file list of files modified by commit "D" (block 626). Similar to the process for commit "F" and commit "E", the commit checker 172 compares the target file list for commit "G" to the intermediary file list for commit "D" (block 628). In the illustrated example, the commit checker 172 may determine that the target file list for commit "G" and the intermediary file list for commit "D" intersect (block 630). For example, the intersection of the lists may have overlapping files meaning that the source code for commit "G" and the source code for commit "D" touch or intersect at least some of the same files. Then, commit checker 172 retains commit "D" in the candidate history list 320 (block 632).

Then, the candidate identifier 170 may instantiate and intermediary file list of files modified by commit "C" (block 634). As discussed above, the target file list may include a list of each file accessed, read, written to, executed, etc. by the source code of commit "C". Then, the commit checker 172 may compare the target file list for commit "G" to the intermediary file list for commit "C" (block 636). In the illustrated example, the commit checker 172 may determine that the target file list for commit "G" and the intermediary file list for commit "C" do not intersect (block 638). For example, the intersection of the lists may be empty meaning that the source code for commit "G" and the source code for commit "C" do not touch or intersect any of the same files. Then, commit checker 172 removes commit "C" from the candidate history list 320 (block 640).

Continuing on FIG. 6B, a patch creator 176 may traverse the candidate history list 320 (block 642). In an example, the patch creator 176 may traverse the candidate history list 320 while the candidate identifier is building the candidate history list 320. For example, the patch creator 176 and candidate identifier 170 may run concurrently. During the traversal, the patch creator 176 may determine that commit "E" is in merge conflict (block 644). If the commit is in merge conflict, the patch creator may automatically create a patch of source code to correct the conflict. For example, the patch creator 176 may compare one or more lines of source code before and after the fault or conflict and determine the difference or delta in the source code. Then, the patch creator may automatically create a patch with updated source code to correct the conflict. In other examples, the patch creator 176 may request a developer to resolve the conflict. Then, the patch creator creates a patch for commit "E" (block 646).

To further optimize the list of commits to back-port, the commit optimizer 174 may temporarily remove each commit one by one to determine if the remaining intermediary commits are required for back-porting. In the illustrated example, the commit optimizer 174 may temporarily remove commit "E" from the candidate history list (block 648). Then, the commit optimizer may apply the patch created for commit "E" (block 650). After applying the patch, the commit optimizer may generate a copy of the temporary candidate history list without commit "E" (block 652). For example, the commit optimizer 174 may copy the candidate history list to a copy history list. Then, the commit optimizer may determine whether the copy of the temporary candidate history list includes errors (block 654). For example, the commit optimizer 174 may attempt to cherry-pick each commit (e.g., commits "D" and commit "B") from the copy of the temporary candidate history list and determine if any of the cherry-pick attempts fail. In the illustrated example, the cherry-pick for commit "D", commit "B" or both may have failed and the commit optimizer determines that removing commit "E" the candidate history list 320 results in an error (block 656). Then, the commit optimizer 174 retains commit "E" in the final history list 330 (block 658).

Then, the commit optimizer 174 may temporarily remove commit "D" from the candidate history list (block 660). The commit optimizer may generate a copy of the temporary candidate history list without commit "D" (block 662). For example, the commit optimizer 174 may copy the candidate history list to a copy history list. Then, the commit optimizer may determine whether the copy of the temporary candidate history list includes errors (block 664). For example, the commit optimizer 174 may attempt to cherry-pick each commit (e.g., commits "E" and commit "B") from the copy of the temporary candidate history list and determine if any of the cherry-pick attempts fail. In the illustrated example, the neither of the cherry-picks for commit "E" or commit "B" failed and the commit optimizer determines that no errors occur from removing commit "D" the candidate history list 320 (block 666). Then, the commit optimizer 174 removes commit "D" from the final history list 330 (block 668).

Then, the commit optimizer 174 creates the final history list with commit "E" and commit "G" (block 670). The final history list 330 identifies which intermediary commits (e.g., commit "E") to back-port along with the original cherry-pick or target commit 230 (e.g., commit "G"). In an example, commit 192E' (e.g., commit "E" with patch "*" that fixes release-critical bug may be back-ported to the release branch.

Figure 7:
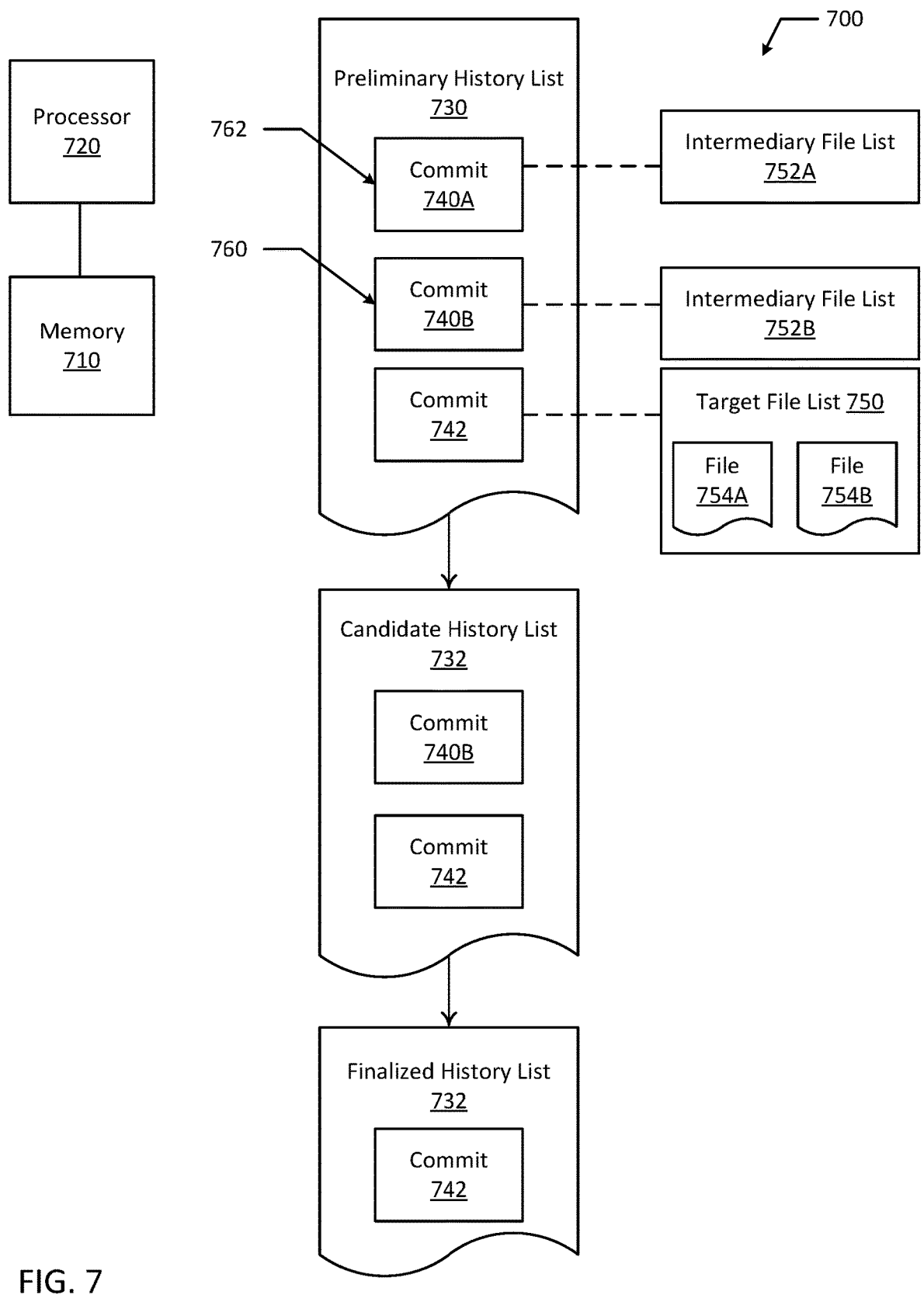
FIG. 7 illustrates a block diagram of an example proactive cherry-picking system according to an example embodiment of the present disclosure.

FIG. 7 is a block diagram of an example proactive cherry-picking system 700 according to an example embodiment of the present disclosure. The system 700 includes a includes a memory 710 and a processor 720 in communication with the memory 710. The processor 720 is configured to build a preliminary history list 730 of a plurality of commits (e.g., commits 740A-B and commit 742) including one or more intermediary commits 740A-B and a target commit 742, instantiate a target file list 750 of one or more files 754A-B modified by the target commit 742, and instantiate an intermediary file list 752A-B for each intermediary commit 740A-B. Additionally, the processor 720 is configured to classify each intermediary commit 740A-B as one of an intersecting commit 760 and an empty commit 762. Responsive to classifying a respective intermediary commit 740A as an empty commit 762, the processor 720 is configured to remove the respective intermediary commit 740A from the preliminary history list 730 to create a candidate history list 732. Responsive to classifying a respective intermediary commit 740B as an intersecting commit 760, the processor 720 is configured to retain the respective intermediary commit 740B in the candidate history list 732. Additionally, the processor is configured to join the respective intermediary file list 752B with the target file list 750 and create a finalized history list 732.

The system 700 automatically and proactively cherry-picks and back-ports the target commit 742 and any related intermediary commits, which may reduce downtime and improve the speed, efficiency and reliability of back-porting commits to a stable branch for a new release compared to existing manual techniques.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes a memory and a processor in communication with the memory. The processor is configured to build a preliminary history list of a plurality of commits including one or more intermediary commits and a target commit. Additionally, the processor is configured to instantiate a target file list of one or more files modified by the target commit, instantiate an intermediary file list for each intermediary commit and classify each intermediary commit as one of an intersecting commit and an empty commit. Responsive to classifying a respective intermediary commit as an empty commit, the processor is configured to remove the respective intermediary commit from the preliminary history list to create a candidate history list. Responsive to classifying a respective intermediary commit as an intersecting commit, the processor is configured to retain the respective intermediary commit in the candidate history list. Additionally, the processor is configured to join the respective intermediary file list with the target file list and create a finalized history list.

In a 2nd exemplary aspect of the present disclosure, which may be used in combination with any one or more of the preceding aspects (e.g., the 1st aspect), the processor is further configured to resolve a merge conflict for at least one commit in the preliminary history list.

In a 3rd exemplary aspect of the present disclosure, which may be used in combination with any one or more of the preceding aspects (e.g., the 2nd aspect), the processor is configured to apply a patch to resolve the merge conflict prior to creating the finalized history list.

In a 4th exemplary aspect of the present disclosure, which may be used in combination with any one or more of the preceding aspects (e.g., the 1st aspect), the intermediary file list is a list of each file modified by a respective intermediary commit.

In a 5th exemplary aspect of the present disclosure, which may be used in combination with any one or more of the preceding aspects (e.g., the 1st aspect), the processor is configured to traverse the candidate history list from an oldest commit to a newest commit, select a candidate commit from the commits in the candidate history list, remove the candidate commit from the candidate history list and create a copy history list, and traverse the copy history list and detect whether a failure occurs. Responsive to a failure occurring, the processor is configured to retain the candidate commit in the candidate history list to create the finalized history list. Responsive to a successful traversal of the copy history list, the processor is configured to remove the candidate commit from the candidate history list in the finalized history list.

In a 6th exemplary aspect of the present disclosure, which may be used in combination with any one or more of the preceding aspects (e.g., the 5th aspect), the processor is further configured to apply a patch prior to creating the copy history list.

In a 7th exemplary aspect of the present disclosure, which may be used in combination with any one or more of the preceding aspects (e.g., the 1st aspect), the processor is further configured to save a hash of a reference commit prior to building a preliminary history list.

In an 8th exemplary aspect of the present disclosure, which may be used in combination with any one or more of the preceding aspects (e.g., the 7th aspect), the processor is configured to traverse the candidate history list from an oldest commit to a newest commit, select a candidate commit from the commits in the candidate history list, and remove the candidate commit from the candidate history list and create a copy history list. The processor is also configured to traverse the copy history list and cherry-pick the target commit and detect whether a failure occurs. Responsive to a failure occurring, the processor is configured to reset to the reference commit and cherry-pick a candidate commit from the candidate history list.

In a 9th exemplary aspect of the present disclosure, which may be used in combination with any one or more of the preceding aspects (e.g., the 8th aspect), the processor is configured to apply a patch while traversing the copy history list.

Aspects of the subject matter described herein may be useful alone or in combination with one or more other aspects described herein. In a 10th exemplary aspect of the present disclosure a method includes building a preliminary history list of a plurality of commits including one or more intermediary commits and a target commit, instantiating a target file list of one or more files modified by the target commit, instantiating an intermediary file list for each intermediary commit, and classifying each intermediary commit as one of an intersecting commit and an empty commit. Responsive to classifying a respective intermediary commit as an empty commit, the method also includes removing the respective intermediary commit from the preliminary history list to create a candidate history list. Responsive to classifying a respective intermediary commit as an intersecting commit, the method also includes retaining the respective intermediary commit in the candidate history list and joining the respective intermediary file list with the target file list. Additionally, the method includes creating a finalized history list.

In an 11th exemplary aspect of the present disclosure, which may be used in combination with any one or more of the preceding aspects (e.g., the 10th aspect), the method also includes resolving merge conflicts for each commit in the history list.

In a 12th exemplary aspect of the present disclosure, which may be used in combination with any one or more of the preceding aspects (e.g., the 11th aspect), resolving merge conflicts includes applying a patch and saving a reference to the patch commit hash.

In a 13th exemplary aspect of the present disclosure, which may be used in combination with any one or more of the preceding aspects (e.g., the 10th aspect), the intermediary file list is a list of each file modified by a respective intermediary commit.

In a 14th exemplary aspect of the present disclosure, which may be used in combination with any one or more of the preceding aspects (e.g., the 10th aspect), creating the finalized history list includes traversing the candidate history list from an oldest commit to a newest commit, selecting a candidate commit from the commits in the candidate history list, removing the candidate commit from the history list and create a copy history list, and traversing the copy history list and detect whether a failure occurs. Additionally, creating the finalized history list also includes responsive to a failure occurring, retaining the candidate commit in the candidate history list. Creating the finalized history list also includes responsive to a successful traversal of the copy history list, removing the candidate commit from the candidate history list.

In a 15th exemplary aspect of the present disclosure, which may be used in combination with any one or more of the preceding aspects (e.g., the 14th aspect), the method further includes applying a patch prior to creating the copy history list.

In a 16th exemplary aspect of the present disclosure, which may be used in combination with any one or more of the preceding aspects (e.g., the 14th aspect), the method further includes saving a hash of a reference commit prior to building a preliminary history list.

In a 17th exemplary aspect of the present disclosure, which may be used in combination with any one or more of the preceding aspects (e.g., the 10th aspect), the method further includes traversing the candidate history list from an oldest commit to a newest commit, selecting a candidate commit from the commits in the candidate history list, removing the candidate commit from the candidate history list and create a copy history list, and traversing the copy history list. The method also includes cherry-picking the target commit and detect whether a failure occurs and responsive to a failure occurring, resetting to a reference commit and cherry-picking a candidate commit from the candidate history list.

Aspects of the subject matter described herein may be useful alone or in combination with one or more other aspects described herein. In an 18th exemplary aspect of the present disclosure a method includes building a preliminary history list of a plurality of commits including one or more intermediary commits and a target commit and creating a candidate history list with a first subset of intermediary commits from the preliminary history list. The method also includes creating a finalized history list with a second subset of intermediary commits from the candidate history list and executing an updated release branch with commits from the finalized history list. The finalized history list includes the target commit. Additionally, the finalized history list includes less commits than the preliminary history list.

In a 19th exemplary aspect of the present disclosure, which may be used in combination with any one or more of the preceding aspects (e.g., the 18th aspect), creating the candidate history list includes instantiating a target file list of one or more files modified by the target commit, instantiating an intermediary file list for each intermediary commit and classifying each intermediary commit as one of an intersecting commit and an empty commit. Additionally, creating the candidate history list includes responsive to classifying a respective intermediary commit as an empty commit, removing the respective intermediary commit from the preliminary history list to create the candidate history list. Creating the candidate history list also includes responsive to classifying a respective intermediary commit as an intersecting commit, retaining the respective intermediary commit in the candidate history list.

In a 20th exemplary aspect of the present disclosure, which may be used in combination with any one or more of the preceding aspects (e.g., the 19th aspect), retaining the respective intermediary commit in the candidate history list includes joining the respective intermediary file list with the target file list prior to classifying the next responsive intermediary commit.

In a 21st exemplary aspect of the present disclosure, which may be used in combination with any one or more of the preceding aspects (e.g., the 19th aspect), the intermediary file list is a list of each file modified by a respective intermediary commit.

In a 22nd exemplary aspect of the present disclosure, which may be used in combination with any one or more of the preceding aspects (e.g., the 18th aspect), the method further includes resolving merge conflicts for each commit in the candidate history list.

In a 23rd exemplary aspect of the present disclosure, which may be used in combination with any one or more of the preceding aspects (e.g., the 22nd aspect), resolving merge conflicts includes applying a patch and saving a reference to a hash of the patch.

In a 24th exemplary aspect of the present disclosure, which may be used in combination with any one or more of the preceding aspects (e.g., the 18th aspect), creating the finalized history list includes traversing the candidate history list from an oldest commit to a newest commit, selecting a candidate commit from the commits in the candidate history list, removing the candidate commit from the history list and create a copy history list, and traversing the copy history list and detect whether a failure occurs. Additionally, creating the finalized history list includes responsive to a failure occurring, retaining the candidate commit in the candidate history list. Creating the finalized history list also includes responsive to a successful traversal of the copy history list, removing the candidate commit from the candidate history list.

In a 25th exemplary aspect of the present disclosure, which may be used in combination with any one or more of the preceding aspects (e.g., the 24th aspect), creating the finalized history list further includes applying a patch prior to creating the copy history list.

Aspects of the subject matter described herein may be useful alone or in combination with one or more other aspects described herein. In a 26th exemplary aspect of the present disclosure a system includes a means for building a preliminary history list of a plurality of commits including one or more intermediary commits and a target commit, a first means for instantiating a target file list of one or more files modified by the target commit, and a second means for instantiating an intermediary file list for each intermediary commit. The system also includes a means for classifying each intermediary commit as one of an intersecting commit and an empty commit, a means for removing the respective intermediary commit from the preliminary history list to create a candidate history list responsive to classifying a respective intermediary commit as an empty commit, and a means for retaining the respective intermediary commit in the candidate history list responsive to classifying a respective intermediary commit as an intersecting commit. Additionally, the system includes a means for joining the respective intermediary file list with the target file list, and a means for creating a finalized history list.

In a 27th exemplary aspect of the present disclosure, which may be used in combination with any one or more of the preceding aspects (e.g., the 26th aspect), the system also includes a means for resolving merge conflicts for each commit in the history list.

In a 28th exemplary aspect of the present disclosure, which may be used in combination with any one or more of the preceding aspects (e.g., the 27th aspect), the system also includes a means for applying a patch and a means for saving a reference to the patch commit hash.

In a 29th exemplary aspect of the present disclosure, which may be used in combination with any one or more of the preceding aspects (e.g., the 26th aspect), the intermediary file list is a list of each file modified by a respective intermediary commit.

In a 30th exemplary aspect of the present disclosure, which may be used in combination with any one or more of the preceding aspects (e.g., the 26th aspect), the means for creating the finalized history list includes a first means for traversing the candidate history list from an oldest commit to a newest commit, a means for selecting a candidate commit from the commits in the candidate history list, and a means for removing the candidate commit from the history list and create a copy history list. The means for creating the finalized history list also includes a second means for traversing the copy history list and detect whether a failure occurs, a means for retaining the candidate commit in the candidate history list responsive to a failure occurring, and a means for removing the candidate commit from the candidate history list responsive to a successful traversal of the copy history list.

Aspects of the subject matter described herein may be useful alone or in combination with one or more other aspects described herein. In a 31st exemplary aspect of the present disclosure a system includes a means for building a preliminary history list of a plurality of commits including one or more intermediary commits and a target commit and a means for creating a candidate history list with a first subset of intermediary commits from the preliminary history list. The system also includes a means for creating a finalized history list with a second subset of intermediary commits from the candidate history list and a means for executing an updated release branch with commits from the finalized history list. The finalized history list includes the target commit. Additionally, the finalized history list includes less commits than the preliminary history list.

In a 32nd exemplary aspect of the present disclosure, which may be used in combination with any one or more of the preceding aspects (e.g., the 31st aspect), the means for creating the candidate history list includes a first means for instantiating a target file list of one or more files modified by the target commit, a second means for instantiating an intermediary file list for each intermediary commit, and a means for classifying each intermediary commit as one of an intersecting commit and an empty commit. The means for creating the candidate history list also includes a means for removing the respective intermediary commit from the preliminary history list to create the candidate history list responsive to classifying a respective intermediary commit as an empty commit and a means for retaining the respective intermediary commit in the candidate history list responsive to classifying a respective intermediary commit as an intersecting commit.

Aspects of the subject matter described herein may be useful alone or in combination with one or more other aspects described herein. In a 33rd exemplary aspect of the present disclosure a non-transitory machine readable medium stores code, which when executed by a processor, causes the processor to build a preliminary history list of a plurality of commits including one or more intermediary commits and a target commit, instantiate a target file list of one or more files modified by the target commit, instantiate an intermediary file list for each intermediary commit, and classify each intermediary commit as one of an intersecting commit and an empty commit. The non-transitory machine readable medium also causes the processor to remove the respective intermediary commit from the preliminary history list to create a candidate history list responsive to classifying a respective intermediary commit as an empty commit. Additionally, the non-transitory machine readable medium causes the processor to retain the respective intermediary commit in the candidate history list and joining the respective intermediary file list with the target file list responsive to classifying a respective intermediary commit as an intersecting commit. Additionally, the non-transitory machine readable medium causes the processor to create a finalized history list.

In a 34th exemplary aspect of the present disclosure, which may be used in combination with any one or more of the preceding aspects (e.g., the 33rd aspect), the processor is further caused to resolve merge conflicts for each commit in the history list.

In a 35th exemplary aspect of the present disclosure, which may be used in combination with any one or more of the preceding aspects (e.g., the 34th aspect), resolving merge conflicts includes applying a patch and saving a reference to the patch commit hash.

In a 36th exemplary aspect of the present disclosure, which may be used in combination with any one or more of the preceding aspects (e.g., the 33rd aspect), the intermediary file list is a list of each file modified by a respective intermediary commit.

Aspects of the subject matter described herein may be useful alone or in combination with one or more other aspects described herein. In a 37th exemplary aspect of the present disclosure a non-transitory machine readable medium stores code, which when executed by a processor, causes the processor to build a preliminary history list of a plurality of commits including one or more intermediary commits and a target commit, create a candidate history list with a first subset of intermediary commits from the preliminary history list, create a finalized history list with a second subset of intermediary commits from the candidate history list, and execute an updated release branch with commits from the finalized history list. The finalized history list includes the target commit. Additionally, the finalized history list includes less commits than the preliminary history list.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
    building a preliminary history list of a plurality of commits including one or more intermediary commits and a target commit;
    instantiating a target file list of one or more files modified by the target commit;
    instantiating an intermediary file list for each intermediary commit;
    classifying each intermediary commit as one of an intersecting commit and an empty commit;

responsive to classifying a respective intermediary commit as an empty commit, removing the respective intermediary commit from the preliminary history list to create a candidate history list;
responsive to classifying a respective intermediary commit as an intersecting commit, retaining the respective intermediary commit in the candidate history list and joining the respective intermediary file list with the target file list; and
creating a finalized history list by:
  traversing the candidate history list from an oldest commit to a newest commit;
  selecting a candidate commit from the commits in the candidate history list;
  removing the candidate commit from the history list and create a copy history list;
  traversing the copy history list and detect whether a failure occurs;
  responsive to a failure occurring, retain the candidate commit in the candidate history list to create the finalized history list; and
  responsive to a successful traversal of the copy history list, removing the candidate commit from the candidate history list.

2. The method of claim 1, further comprising resolving merge conflicts for each commit in the history list.

3. The method of claim 2, wherein resolving merge conflicts includes applying a patch and saving a reference to the patch commit hash.

4. The method of claim 1, wherein the intermediary file list is a list of each file modified by a respective intermediary commit.

5. The method of claim 1, further comprising applying a patch prior to creating the copy history list.

6. The method of claim 1, further comprising saving a hash of a reference commit prior to building a preliminary history list.

7. The method of claim 1, further comprising:
traversing the candidate history list from an oldest commit to a newest commit;
selecting a candidate commit from the commits in the candidate history list;
removing the candidate commit from the candidate history list and create a copy history list;
traversing the copy history list;
  cherry-picking the target commit and detect whether a failure occurs; and
  responsive to a failure occurring, resetting to a reference commit and cherry-picking a candidate commit from the candidate history list.

8. A system comprising:
a memory; and
a processor in communication with the memory and configured to:
  build a preliminary history list of a plurality of commits including one or more intermediary commits and a target commit,
  instantiate a target file list of one or more files modified by the target commit,
  instantiate an intermediary file list for each intermediary commit,
  classify each intermediary commit as one of an intersecting commit and an empty commit,
  responsive to classifying a respective intermediary commit as an empty commit, remove the respective intermediary commit from the preliminary history list to create a candidate history list,
  responsive to classifying a respective intermediary commit as an intersecting commit, retain the respective intermediary commit in the candidate history list,
  join the respective intermediary file list with the target file list, and
  create a finalized history list by:
    traversing the candidate history list from an oldest commit to a newest commit;
    selecting a candidate commit from the commits in the candidate history list;
    removing the candidate commit from the candidate history list and create a copy history list;
    traversing the copy history list and detect whether a failure occurs;
    responsive to a failure occurring, retain the candidate commit in the candidate history list to create the finalized history list; and
    responsive to a successful traversal of the copy history list, removing the candidate commit from the candidate history list in the finalized history list.

9. The system of claim 8, wherein the processor is further configured to resolve a merge conflict for at least one commit in the preliminary history list.

10. The system of claim 9, wherein the processor is configured to apply a patch to resolve the merge conflict prior to creating the finalized history list.

11. The system of claim 8, wherein the intermediary file list is a list of each file modified by a respective intermediary commit.

12. The system of claim 8, wherein the processor is further configured to apply a patch prior to creating the copy history list.

13. The system of claim 8, wherein the processor is further configured to save a hash of a reference commit prior to building a preliminary history list.

14. The system of claim 13, wherein the processor is configured to:
traverse the candidate history list from an oldest commit to a newest commit,
select a candidate commit from the commits in the candidate history list,
remove the candidate commit from the candidate history list and create a copy history list,
traverse the copy history list,
cherry-pick the target commit and detect whether a failure occurs, and
responsive to a failure occurring, reset to the reference commit and cherry-pick a candidate commit from the candidate history list.

15. The system of claim 14, wherein the processor is configured to apply a patch while traversing the copy history list.

16. A non-transitory computer readable medium storing instructions that, when executed by one or more processors, cause the one or more processors to perform steps comprising:
building a preliminary history list of a plurality of commits including one or more intermediary commits and a target commit;
creating a candidate history list with a first subset of intermediary commits from the preliminary history list by:
  instantiating a target file list of one or more files modified by the target commit;

instantiating an intermediary file list for each intermediary commit;

classifying each intermediary commit as one of an intersecting commit and an empty commit;

responsive to classifying a respective intermediary commit as an empty commit, removing the respective intermediary commit from the preliminary history list to create the candidate history list; and responsive to classifying a respective intermediary commit as an intersecting commit, retaining the respective intermediary commit in the candidate history list;

creating a finalized history list with a second subset of intermediary commits from the candidate history list by:

traversing the candidate history list from an oldest commit to a newest commit;

selecting a candidate commit from the commits in the candidate history list;

removing the candidate commit from the history list and create a copy history list;

traversing the copy history list and detect whether a failure occurs;

responsive to a failure occurring, retain the candidate commit in the candidate history list to create the finalized history list; and responsive to a successful traversal of the copy history list, removing the candidate commit from the candidate history list; and executing an updated release branch with commits from the finalized history list, wherein the finalized history list includes the target commit, and wherein the finalized history list includes less commits than the preliminary history list.

17. The non-transitory computer readable medium of claim 16, wherein retaining the respective intermediary commit in the candidate history list comprises joining the respective intermediary file list with the target file list prior to classifying the next respective intermediary commit.

\* \* \* \* \*